H. A. WAHLERI.
HAND BRAKE.
APPLICATION FILED APR. 12, 1918.

1,343,697.

Patented June 15, 1920.

INVENTOR
H.A.Wahlert
by Wm. M. Cady
Atty.

UNITED STATES PATENT OFFICE.

HENRY A. WAHLERT, OF ST. LOUIS, MISSOURI, ASSIGNOR TO THE AMERICAN BRAKE COMPANY, OF ST. LOUIS, MISSOURI, A CORPORATION OF MISSOURI.

HAND-BRAKE.

1,343,697.         Specification of Letters Patent.     Patented June 15, 1920.

Application filed April 12, 1918.  Serial No. 228,119.

*To all whom it may concern:*

Be it known that I, HENRY A. WAHLERT, a citizen of the United States, residing at St. Louis, in the State of Missouri, have invented new and useful Improvements in Hand-Brakes, of which the following is a specification.

This invention relates to hand brakes, more particularly adapted for use on railway freight cars.

The principal object of my invention is to provide a compact hand brake adapted to quickly take up the slack and then apply the brakes with great force.

Figure 1:
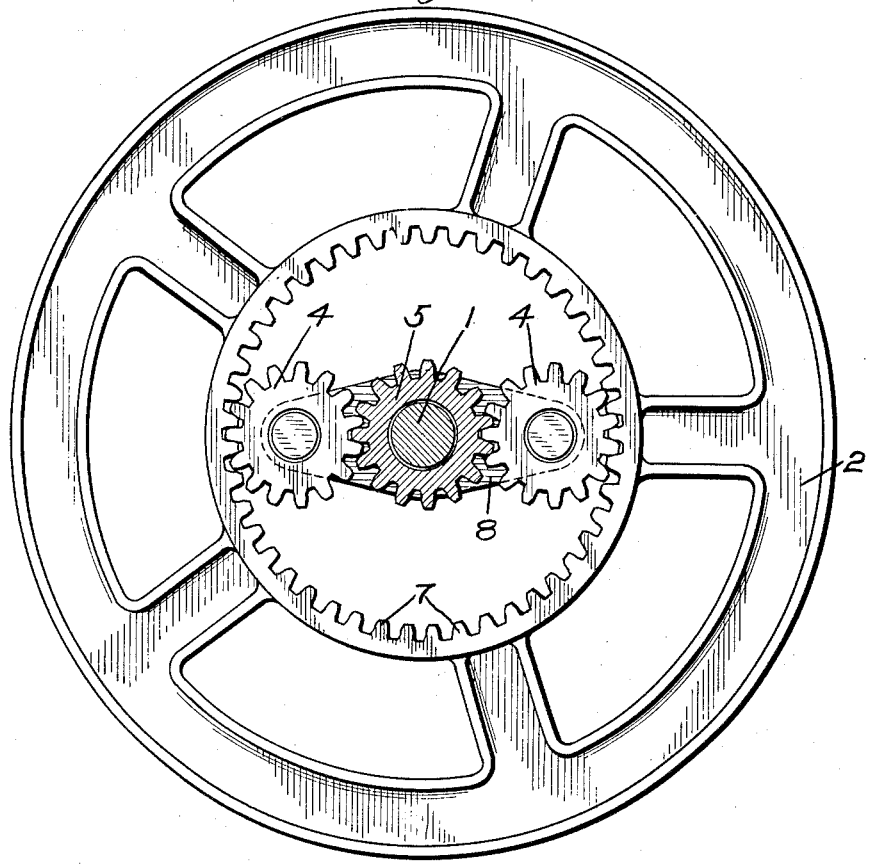
Figure 2:
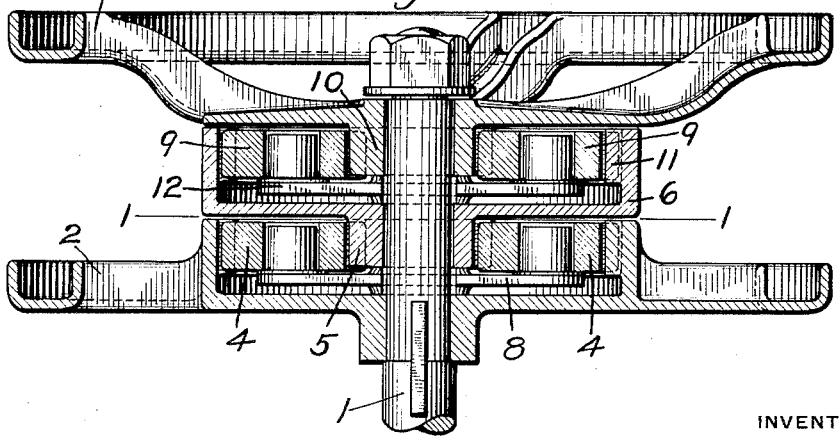

In the accompanying drawing, Figure 1 is a horizontal section on the line 1—1 of Fig. 2 of a hand brake device embodying my invention, and Fig. 2 a central vertical section of the hand brake device.

As shown in the drawing, the hand brake device is applied to the usual brake staff 1 in place of the usual hand wheel and may comprise a hand wheel 2, keyed directly to the brake staff 1 for winding up the brake chain to take up the slack, and a hand wheel 3 which is operatively connected to the hand wheel 2 through one or more planetary gear trains.

In the construction shown in the drawing, two planetary gear trains are employed, one of which is mounted in the hand wheel 2 and comprises gears 4 adapted to mesh with a central pinion 5 carried by an intermediate member 6. The hand wheel 2 is provided with internal gear teeth 7 adapted to mesh with the gears 4, said gears being maintained in their relative positions by means of a spacing member 8.

Mounted within the intermediate member 6, are gears 9 adapted to mesh with a central pinion 10 carried by the hand wheel 3, and with internal gear teeth 11, provided on the member 6, the gears 9 being held in their spaced relation by means of a spacing member 12.

In operation, the hand wheel 2 is first turned to effect the direct rotation of the brake staff 1, so as to wind up the usual brake chain and take up the slack, and then the hand wheel 3 is turned to apply the brakes with force.

Upon turning the hand wheel 3 the pinion 10 is rotated and the force is transmitted through the gears 9 to the intermediate members 6 which is then rotated. Force is transmitted from the pinion 5 through the gears 4 to the hand wheel 2, which is thereby turned to effect the rotation of the brake staff 1.

The gears 4 and 9 may be made of any desired ratio with respect to the coöperating internal gears, and if, for example, the gear ratio of each planetary system is as three to one, then the application of a force of one pound on the hand wheel 3 will be multiplied to nine pounds at the brake staff 1.

Thus a quick take up of slack is provided, as well as a high multiplication of force.

The above described construction being applied to the brake staff as a self contained unit in place of the ordinary hand wheel, no modification of the brake chain mechanism is required.

By employing a planetary gear system, the gear pressures are so balanced that the wear on the gear teeth is equally distributed and likewise the wear on the bearings is balanced and reduced to a minimum. Furthermore, this arrangement of gearing permits the use of parts of ample strength within a limited space.

Having now described my invention, what I claim as new and desire to secure by Letters Patent, is:

1. In a hand brake device, the combination with a brake staff, of a hand wheel directly connected to said brake staff, a power hand wheel, and a plurality of planetary gear systems for operatively connecting the power hand wheel to said brake staff.

2. In a hand brake device, the combination with a brake staff, of a hand wheel directly secured to said brake staff, and provided with an internal gear, gears meshing with said internal gear, a power hand wheel provided with a pinion, gears meshing with said pinion, and an intermediate geared member for operatively connecting the two sets of gears.

3. In a hand brake device, the combination with a brake staff, of a hand wheel directly secured to said brake staff and provided with an internal gear, a set of gears meshing with said internal gear, a power hand wheel provided with a pinion, a second set of gears meshing with said pinion, and an intermediate geared member having a pinion meshing with the first set of gears and an internal gear meshing with the second set of gears.

In testimony whereof I have hereunto set my hand.

HENRY A. WAHLERT.